United States Patent Office 3,574,764
Patented Apr. 13, 1971

3,574,764
PROCESS FOR PRODUCING SATURATED ALIPHATIC ALDEHYDES
Xaver Gregory and Franz Büttner, Burghausen, Upper Bavaria, Germany, assignors to Wacher-Chemie G.m.b.H., Munich, Germany
No Drawing. Filed Feb. 15, 1965, Ser. No. 432,809
Claims priority, application Germany, Mar. 7, 1964, W 36,340
Int. Cl. C07c 45/20
U.S. Cl. 260—601
3 Claims

ABSTRACT OF THE DISCLOSURE

In the process of the invention hydrogen and an unsaturated aliphatic aldehyde are passed in the vapor phase in contact with a catalyst, the said catalyst consisting essentially of nickel and a substance selected from the group consisting of elementary sulphur, sulfidic additives and sulphur compounds which are reducible under the conditions of the reaction, the sulphur content of said catalyst being 5–30% by weight referred to the metallic nickel in the catalyst.

---

This invention relates to producing saturated aliphatic aldehydes, and it has for its object to provide a novel and improved process for this purpose.

Another object of the invention is to provide an efficient, economical process for producing saturated aliphatic aldehydes by the selective catalytic hydrogenation of unsaturated aliphatic aldehydes.

With known methods of producing saturated aliphatic aldehydes by selective hydrogenation of the corresponding unsaturated aldehydes with copper-base catalysts only relatively low yields can be obtained. For instance, from crotonaldehyde one obtains by hydrogenation in the vapor phase, with copper as catalyst, a raw butyric aldehyde containing a maximum of 70% butyric aldehyde and about 20% crotonaldehyde. The unconverted, contaminated crotonaldehyde cannot be returned to the process because it would be too detrimental to the life span of the contact.

The processes for obtaining saturated aliphatic aldehydes by dehydration of the corresponding alcohols over copper catalysts do not attain any higher yields, either, and they have the additional drawback that during the distillative separation of the reaction products—due to the high alcohol content—acetals form easily, thus causing a further loss.

Moreover, the use of nickel contacts for the partial hydrogenation of unsaturated aliphatic aldehydes gives only unsatisfactory yields, too, but their effect is aided in part by different additives, e.g. by copper and sulphate ions. For instance, the maximum conversion in a process for producing butyric aldehyde with a nickel contact by adding copper and sulphate ions is 86.5%. Even by partially reduced nickel catalysts one can obtain only an 84% raw butyric aldehyde.

Another process for producing butyric aldehyde, using a catalyst obtained by impregnating nickel oxide with lithium or sodium salts and subsequently glowing at about 1000° C., yields only an 87–88% raw butyric aldehyde.

Nickel catalysts have also been used for the selective hydrogenation in the liquid phase of butinediol into butenediol, but these are not selective enough and cause super-hydrogenation toward the butanediol. However, contaminated or deactivated catalysts give only a small reaction speed and have a comparatively short stability.

When using palladium catalysts, side reactions very easily occur in the liquid phase, e.g. isomerization, resinification and splitting into gaseous products. Copper-equipped palladium contacts for the selective hydrogenation of organic compounds in the liquid phase, compared with catalysis in the vapor phase, have the disadvantage that one must work under pressure, and also the problem arises of separating the catalyst from the reaction mixture.

Also suffering under the drawbacks of liquid phase hydrogenation under pressure is a process for hydrogenating organic acids into the corresponding alcohols. The catalyst contaminated by sulphur is made by sintering the oxides of metals of Groups I–B, VII and VIII at relatively high temperatures of 800–1,400° C.

We have now discovered a process for producing saturated aliphatic aldehydes by selective catalytic hydrogenation of unsaturated aliphatic aldehydes, using nickel catalysts, in the vapor phase and under normal pressure. The process is characterized by the fact that these catalysts include sulfidic additives and/or elementary sulphur and/or sulphur compounds reducible under the reaction conditions—in a concentration of 5–30 weight percent, referred to metallic nickel.

While with nickel catalysts without additives up to 10% of the used aldehyde is split into carbon monoxide and volatile organic side products, and on metal-equipped nickel contacts this splitting hardly goes below 3–4%, it is possible by the process of the present invention to reduce this split to 0.2–1% referred to the used unsaturated aldehyde. This circumstance is of technical significance because the gaseous cracking products disappear in the process.

Moreover, in the process of our invention the poisoning of the catalyst by the carbon monoxide which acts as a catalyst poison—is reduced to a minimum. This may be a reversible poisoning by absorbed carbon monoxide, which then is transformed into an irreversible poisoning owing to a change of the catalyst structure by intermediarily formed nickel carbonyl and thereby severely limits the life span of the catalyst.

It should further be noted in this connection that by sluicing out the split products from the process conducted with circulating gas, considerable quantities of hydrogen are lost, which in the process of the present invention is reduced to a percentage that is technically and economically justifiable.

Also, by the partial poisoning of the nickel catalyst the yield of saturated aldehyde can be substantially increased, i.e. the selectivity of the contact is increased considerably. Also, the catalyst is notable for a very simple production method and a long life span. Moreover, the formation of troublesome side products, particularly unsaturated alcohols, such as occurs with copper catalysts, among others, is almost zero.

The partial vapor phase hydrogenation of unsaturated aliphatic aldehydes with our improved catalysts is performed under normal pressure at 140–250° C.

The contact is obtained by homogeneous mixing of nickel oxide or basic nickel carbonate with a maximum of 30% sulphur, referred to metallic nickel, the sulphur stemming from a sulphur compound or being added as an element, and applying it together with kieselguhr to pumice stone, using sodium silicate as a binding agent. The contact is reduced at 100–250° C. in an $H_2$ stream.

Sulphides can also be added directly or they can be precipitated on the contact with a corresponding quantity of hydrogen sulphide.

The process is carried out as follows: the unsaturated aldehyde is fed with a measuring pump into an oil-heated vaporizer and is conducted with 4–20 times the theoretically needed quantity of hydrogen through the solid bed filled with the catalyst (2 liters contact volume) or through a vortex stratum. The former consists of an iron pipe 1 m. long with a diameter of 50 mm., and a heating jacket. A high temperature thermostat with oil filling regulates the temperature in the reactor. The gas mixture leaving the oven is freed of the reaction products in a water cooler and in two methanol Dry Ice coolers and is piped back into the apparatus through a blower as return hydrogen after addition of fresh hydrogen.

EXAMPLE 1 (WITHOUT SELECTIVE ADDITIVE)

A catalyst with a nickel content of 3 weight percent on a pumice stone-kieselguhr carrier, under a load or charge of 150 ml. crotonaldehyde and 300 l. hydrogen/l. contact per hour at 200° C. yields a raw product with 82.5% butyric aldehyde, 2% crotonaldehyde and 15.5% butanol. The splitting into carbon monoxide and $C_3$ hydrocarbons amounts to about 8% of the input.

EXAMPLE 2

A catalyst consisting of 5.5 weight percent nickel and 10 weight percent sulphide sulphur (referred to metallic nickel) on a pumice stone-kieselguhr carrier, under a load of 150 ml. crotonaldehyde and 200 l. hydrogen/l. contact per hour at 200° C. yields a raw product with 96% butyric aldehyde, 1.5% crotonaldehyde, balance butanol. The splitting amounts to 0.3% of the input.

EXAMPLE 3

A catalyst consisting of 3 weight percent nickel and 20 weight percent elementary sulphur (referred to metallic nickel) on a pumice stone-kieselguhr carrier, under a load of 150 ml. crotonaldehyde and 300 l. hydrogen/l. contact per hour at 200° C. yields a raw product with 96.5% butyric aldehyde, 1% crotonaldehyde, balance butanol. The splitting is about 0.2% of the input.

EXAMPLE 4

The above catalyst (Example 3) under a load of 200 ml. acrolein and 300 l. hydrogen/l. contact per hour at 200° C. yields a raw product with 94% propionic aldehyde and 1% acrolein, the balance being partly hydrogenated impurities of the starting materials. The splitting amounts to 0.2% of the input.

EXAMPLE 5

The same catalyst (Examples 3 and 4) under a load of 130 ml. 2-ethyl hexenal and 150 l. hydrogen/l. contact per hour at 225° C. yields a raw product with 96.0% 2-ethyl hexanal and 2.5% 2-ethyl hexenal. Balance is 2-ethyl hexanol and partly hydrogenated impurities of the starting materials. The splitting amounts to 0.4% of the input.

The invention claimed is:
1. Process for producing saturated aliphatic aldehydes by selective catalytic hydrogenation of an alkenal, which comprises passing hydrogen and an alkenal in the vapor phase in contact with a catalyst, said process being characterized by the fact that said catalyst consists essentially of nickel and elementary sulphur, the sulphur content of said catalyst being 5–30% by weight referred to the metallic nickel in the catalyst, said process being continued until a substantial proportion of the aldehyde is fully saturated.
2. Process according to claim 1, which is carried out at normal pressure and at a temperature of 140–250° C.
3. Process according to claim 2, in which the mixture of hydrogen and an alkenal passed in contact with said catalyst contains 4–20 times the theoretically needed quantity of hydrogen, and in which excess hydrogen remaining after the reaction is returned to the catalytic reaction zone together with fresh hydrogen.

References Cited

UNITED STATES PATENTS

| 2,734,921 | 2/1956 | Bewley et al. | 260—601 |
| 2,511,453 | 6/1950 | Barry | 252—439X |
| 2,402,683 | 6/1946 | Signaigo | 260—690X |
| 2,402,493 | 6/1946 | Greensfelder et al. | 260—683.9X |

OTHER REFERENCES

Anderson et al.: Chem. Abstracts 43, 1554*h*, 1949.
Bataafsche: Petroleum, Chem. Abstracts 47, 2193–2194, 1953.

BERNARD HELFIN, Primary Examiner
R. H. LILES, Assistant Examiner